United States Patent [19]

McGuire

[11] Patent Number: 4,536,246

[45] Date of Patent: Aug. 20, 1985

[54] FLEXIBLE DUCT FORMING APPARATUS

[76] Inventor: Hugh K. McGuire, 5220 Satsuma, North Hollywood, Calif. 91601

[21] Appl. No.: 423,669

[22] Filed: Sep. 27, 1982

Related U.S. Application Data

[63] Continuation-in-part of Ser. No. 161,425, Jun. 20, 1980, Pat. No. 4,351,682.

[51] Int. Cl.³ ............................................. B65H 81/00
[52] U.S. Cl. ...................................... 156/429; 156/143
[58] Field of Search ............... 156/143, 144, 195, 171, 156/429, 428, 425, 353, 360, 361; 39/456, 505; 138/139

[56] References Cited

U.S. PATENT DOCUMENTS

| | | | |
|---|---|---|---|
| 3,216,459 | 11/1965 | Schroeder et al. | 138/139 |
| 3,604,462 | 9/1971 | Dreher et al. | 138/139 |
| 3,817,804 | 6/1974 | Helmick et al. | 156/144 |
| 3,950,213 | 4/1976 | Rejeski et al. | 156/144 |
| 4,023,589 | 5/1977 | Rejeski | 156/203 |
| 4,174,984 | 11/1979 | Meadows | 156/446 |
| 4,351,682 | 9/1982 | McGuire | 156/143 |

Primary Examiner—Michael Ball
Attorney, Agent, or Firm—David O'Reilly

[57] ABSTRACT

A flexible duct forming apparatus and method in which flexible strip material is wrapped on a rotating mandrel in a helical path, with the edges of the flexible strip material overlapping a pre-determined amount. Reinforcing wire is formed into a helix of substantially constant diameter and pitch and guided by a fixed helical means between the overlapping edges of the flexible strip material. The overlapping edges of the flexible strip material are then pressed around the reinforcing wire to seal and encapsulate the wire to continuously form flexible duct. The reinforcing wire is formed into the substantially constant helix by a fixed helical means which is interchangeably mounted on a base as is the mandrel, so that the apparatus can be used to manufacture different diameter flexible ducting.

27 Claims, 16 Drawing Figures

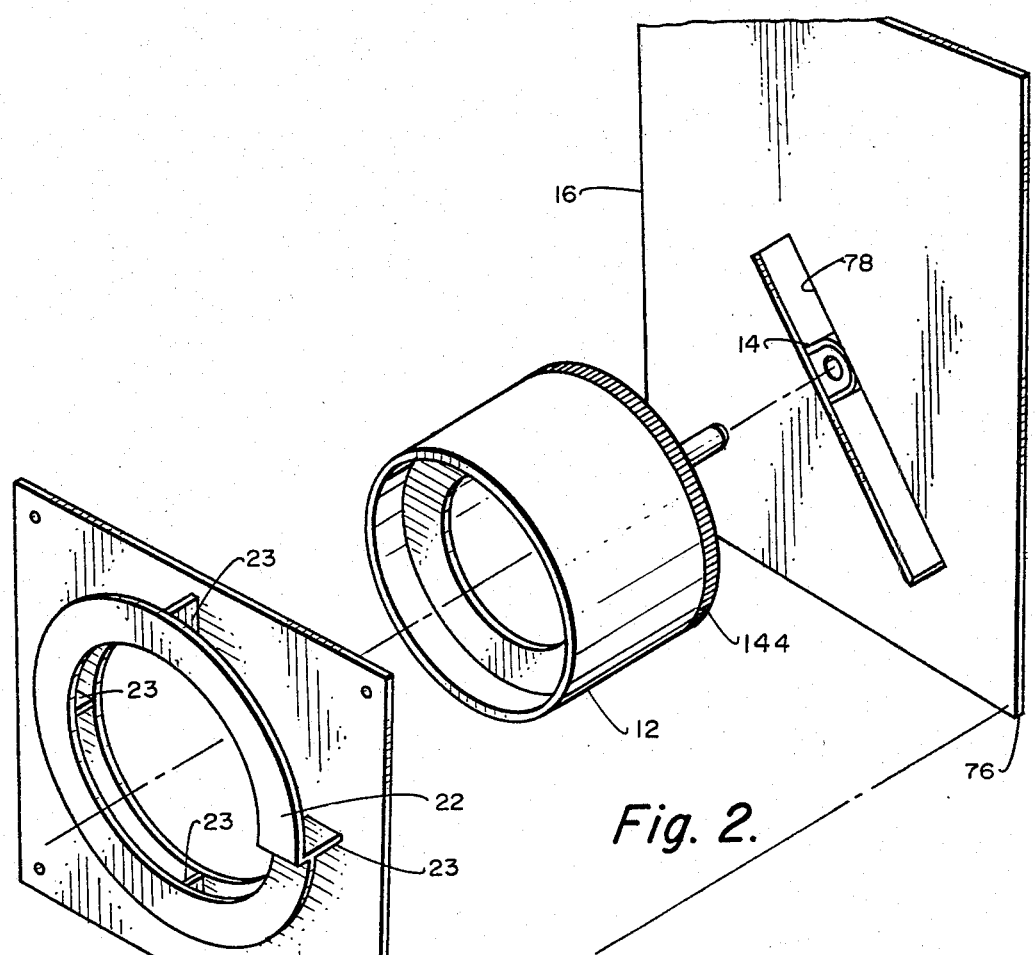
Fig. 2.
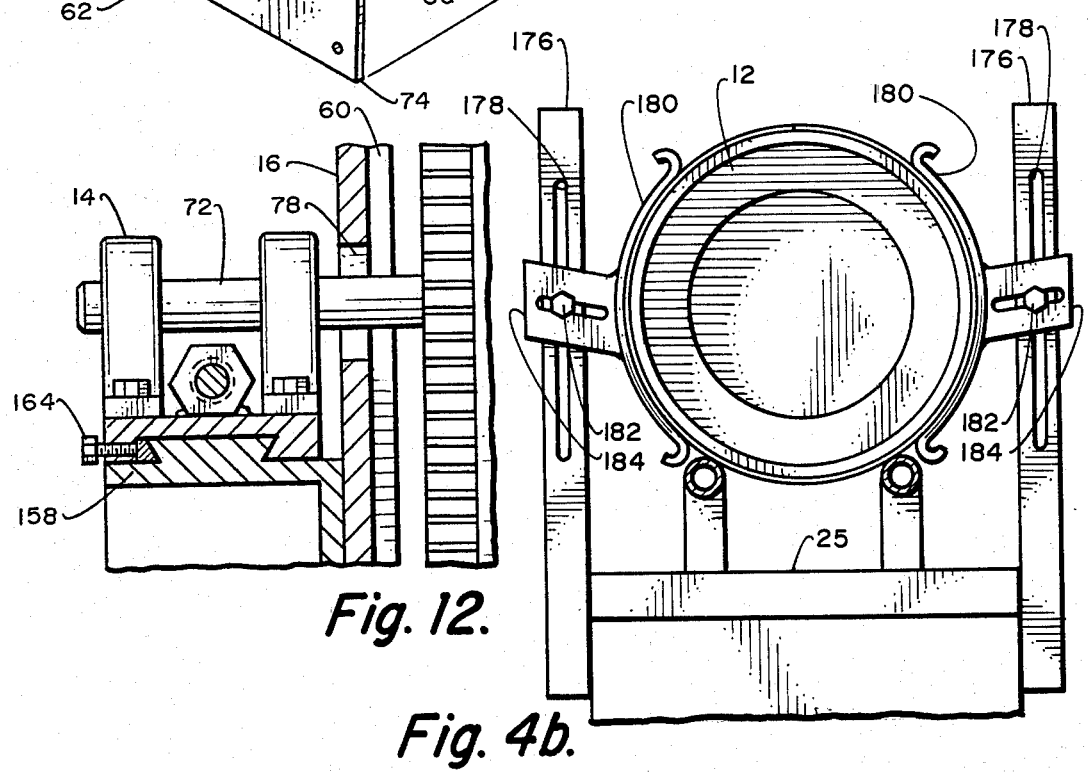
Fig. 12.
Fig. 4b.

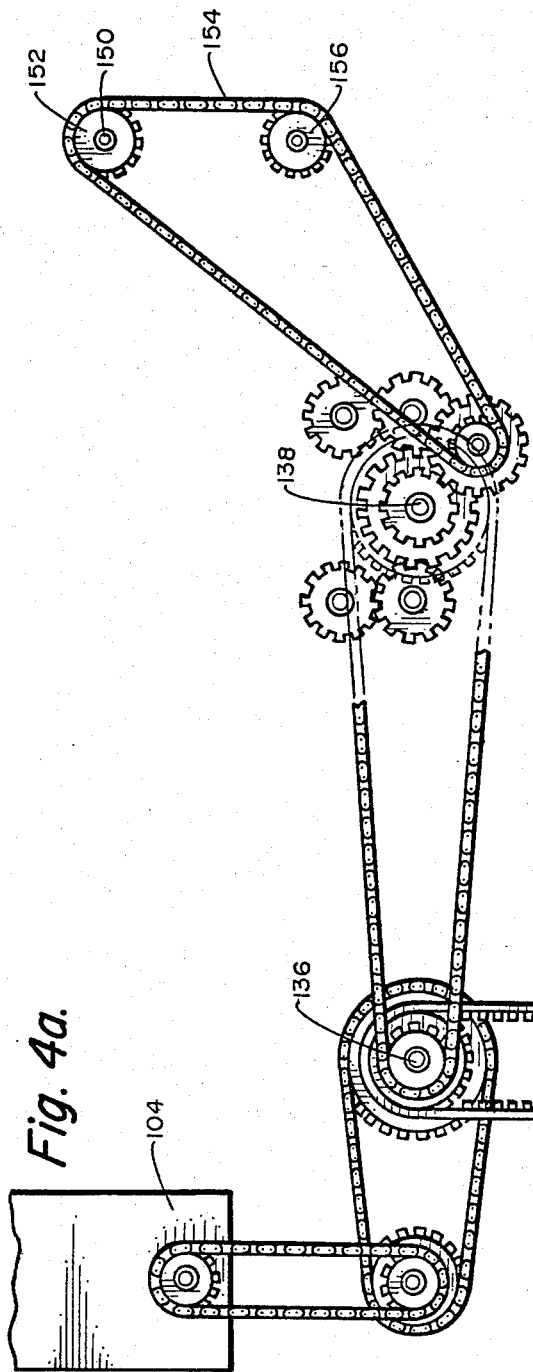
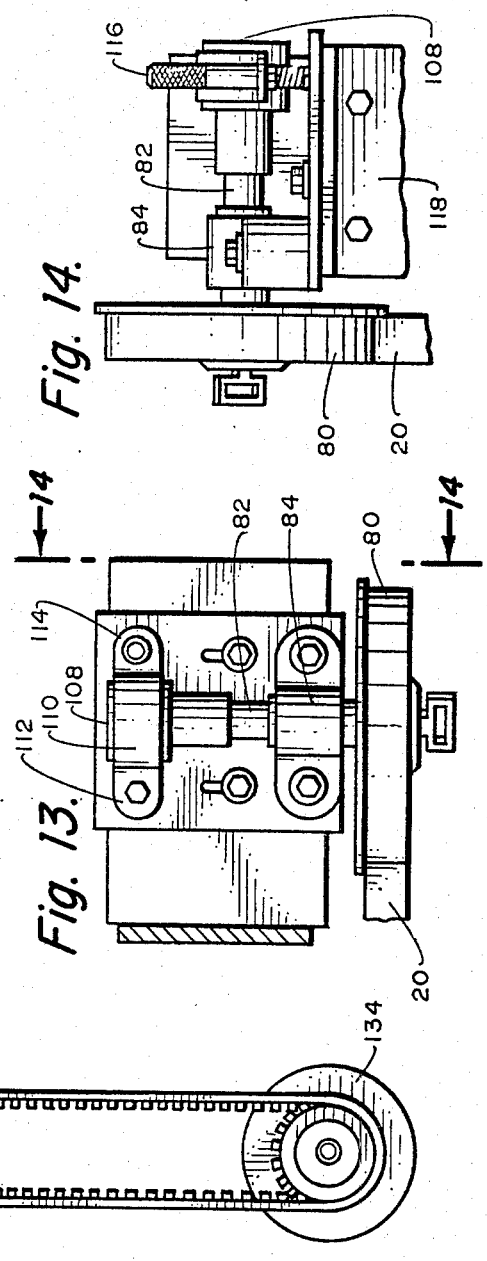

FLEXIBLE DUCT FORMING APPARATUS

This application is a continuation in part of application Ser. No. 161,425, filed June 20, 1980, now U.S. Pat. No. 4,351,682, issued Sept. 28, 1982.

BACKGROUND OF THE INVENTION

This invention relates to flexible ducting and, more particularly, relates to an apparatus and method for manufacturing such flexible ducting and is an improvement over U.S. Pat. No. 4,351,682.

Flexible ducting for use in heating and air conditioning applications is constructed of a reinforcing wire formed into a helix covered by a plastic material. One method of manufacturing such ducting is to use an elongated mandrel and fabricate the ducting in predetermined lengths. A reinforcing wire is wound on the mandrel and a sheet of plastic is then laid over the reinforcing wire. Adhesive on the wire secures the reinforcing wire to the plastic sheet. The flexible ducting may then be covered with insulation and an outer sleeve to complete the assembly.

There are also machines in the prior art for continuously forming flexible ducting, in which a reinforcing wire is continously formed into a helix on a plurality of rollers or a mandrel which is simultaneously covered by continuous wraps of flexible strip material secured around the reinforcing wire with an adhesive. In one such device, reinforcing wire is wound on a plurality of supporting rollers mounted in circumferentially spaced relationship onto which the reinforcing wire and flexible strip material are fed to produce a flexible duct.

Another prior art device employs a cantilevered, free-wheeling mandrel which receives flexible strip material and reinforcing wire along a helical path with consecutive wraps of the flexible strip material forming a flexible duct with a continuous helical seam. Generally, the prior art devices require clinch rollers to drive and seal successive laps during use. They are also quite complex, and, although they provide means for manufacturing various diameter ducts, they are not readily adaptable for this purpose. Further, they are not readily adaptable for use with a variety of materials, and their rates of production (i.e., ft/min) is somewhat less than desirable.

SUMMARY OF THE INVENTION

The purpose of the present invention is to provide an improved flexible duct forming apparatus readily adaptable to form flexible duct in a variety of diameters, of various materials utilizing a variety of sealing methods and having a relatively high production rate.

The present invention is an improvement to the device disclosed in U.S. Pat. No. 4,351,682, issued Sept. 28, 1982 and provides means for continuously winding reinforcing wire on a rotating mandrel at a predetermined pitch and encapsulating the wire in overlapping wraps of flexible strip material which is sealed around a wire in any suitable manner, such as with an adhesive. The reinforcing wire is deformed by a plurality of adjustable casting rollers and guided onto the rotating mandrel in a helix which is substantially constant in pitch and diameter. The pitch and diameter of the reinforcing wire guided onto the rotating mandrel is determined by a wire-forming assembly having a fixed helical means in the form of a helical ring having guide means attached to the ring. Flexible strip material is simultaneously wrapped around the mandrel in a helical pad from a supply roll with successive edges of the helically wrapped flexible strip overlapping to encapsulate the reinforcing wire.

In the preferred method, at least two continuous streams of adhesive are applied to one side of the flexible strip at the overlapping edge area as the strip is being wrapped on the mandrel. Preferably a third continuous stream is provided between the first two to securely bond the reinforcing wire to the material, minimizing any possible movement. Sealing means is provided in the form of means to press the overlapping edges of the flexible strip material around the reinforcing wire to seal and encapsulate the wire. The feed systems for the reinforcing wire, flexible strip material and adhesive, are all linked to a common drive system driven by a variable speed motor and, thus, are automatically synchronized.

In order to produce flexible duct in a variety of diameters and of various materials, the flexible duct forming apparatus has a base with an adjustable bearing for cantilevered mounting of different diameter mandrels. In addition, the fixed helical means in the form of a wire-forming assembly having a helical ring is provided for each size mandrel and is adapted to be removably mounted on the base. The mandrel support bearing is adjustably mounted on a track attached to the base allowing set-up of the apparatus for different diameter ducts by simply replacing the mandrel with a different diameter and changing the wire-forming assembly accordingly. Thus, the flexible duct forming machine can be easily changed from producing one diameter duct to producing another in a relatively simple manner by replacing the mandrel and the fixed helical guide means.

The completed duct is cut into predetermined lengths as it is guided off the mandrel by adjustable guides. These lengths are usually in increments of five feet; such as twenty feet, twenty five feet, etc. The length of preformed duct coming off the mandrel is determined by a counter which counts increments of reinforcing wire fed to the duct forming machine. When the counter reaches a predetermined count, it automatically resets to zero, indicating that a predetermined length of preformed duct has been completed. The operator may then cut the duct at the predetermined length. The adjustable guides apply a light pressure as they pull the completed preformed duct off the mandrel, thus effectively testing the duct to be sure the adhesive has securely bonded the flexible material around the reinforcing wire.

It is one object of the present invention to provide a flexible duct forming apparatus which permits continuous forming of flexible duct of different diameters.

Another object of the present invention is to provide a flexible duct forming apparatus which is simple and easy to change from producing one diameter duct to the production of another.

Yet another object of the present invention is to provide a flexible duct forming apparatus which has interchangeable mandrel and reinforcing wire forming means for producing different diameter ducts.

Still another object of the present invention is to provide a flexible duct forming apparatus in which the feed system for the materials for forming the flexible duct are automatically synchronized.

Yet another object of the present invention is to provide a flexible duct forming machine having a variable drive system for simplifying start-up and synchronization of the various materials forming the duct.

Still another object of the present invention is to provide a flexible duct forming machine adaptable to provide flexible duct from a variety of materials.

Another object of the present invention is to produce flexible duct from a variety of flexible strip materials using various sealing methods.

Yet another object of the present invention is to provide a flexible duct forming apparatus having an interchangeable helical ring for guiding reinforcing wire in a substantially constant helix onto a rotating mandrel.

Still another object of the present invention is to provide a flexible duct forming apparatus and method which permits continuous formation of flexible duct at a relatively high production rate by use of a fixed helical means for feeding reinforcing wire and flexible strip material to a rotating mandrel.

Another object of the present invention is to provide means for determining the length of duct as it is formed.

Yet another object of the present invention is to provide a counter which counts the quantity of reinforcing wire supplied to the duct forming machine, thereby indicating the length of duct being formed.

Still another object of the present invention is to provide adjustable guide means for guiding preformed duct off the duct forming machine which tests bonding of the duct.

These and other objects, advantages and novel features of the invention become apparent from the following detailed description of the invention, when considered in conjunction with the accompanying drawings in which like reference numbers identify like parts throughout, wherein:

BRIEF DESCRIPTION OF THE DRAWINGS

FIG. 2 is a perspective view, illustrating the interchangeability of the mandrel and fixed helical means of the flexible duct forming apparatus;

FIG. 4a is a schematic rear view illustrating the drive system for the flexible duct forming apparatus shown in FIG. 4;

FIG. 4b is a partial sectional view taken at 4b—4b of FIG. 3.

FIG. 12 is a partial sectional view taken at 12—12 of FIG. 4;

FIG. 13 is a top view in partial section illustrating an adjustable braking device for the flexible strip material delivery system at 13—13 of FIG. 1;

FIG. 14 is a side view in partial section taken at 14—14 of FIG. 13.

DETAILED DESCRIPTION OF THE INVENTION

Figure 1:
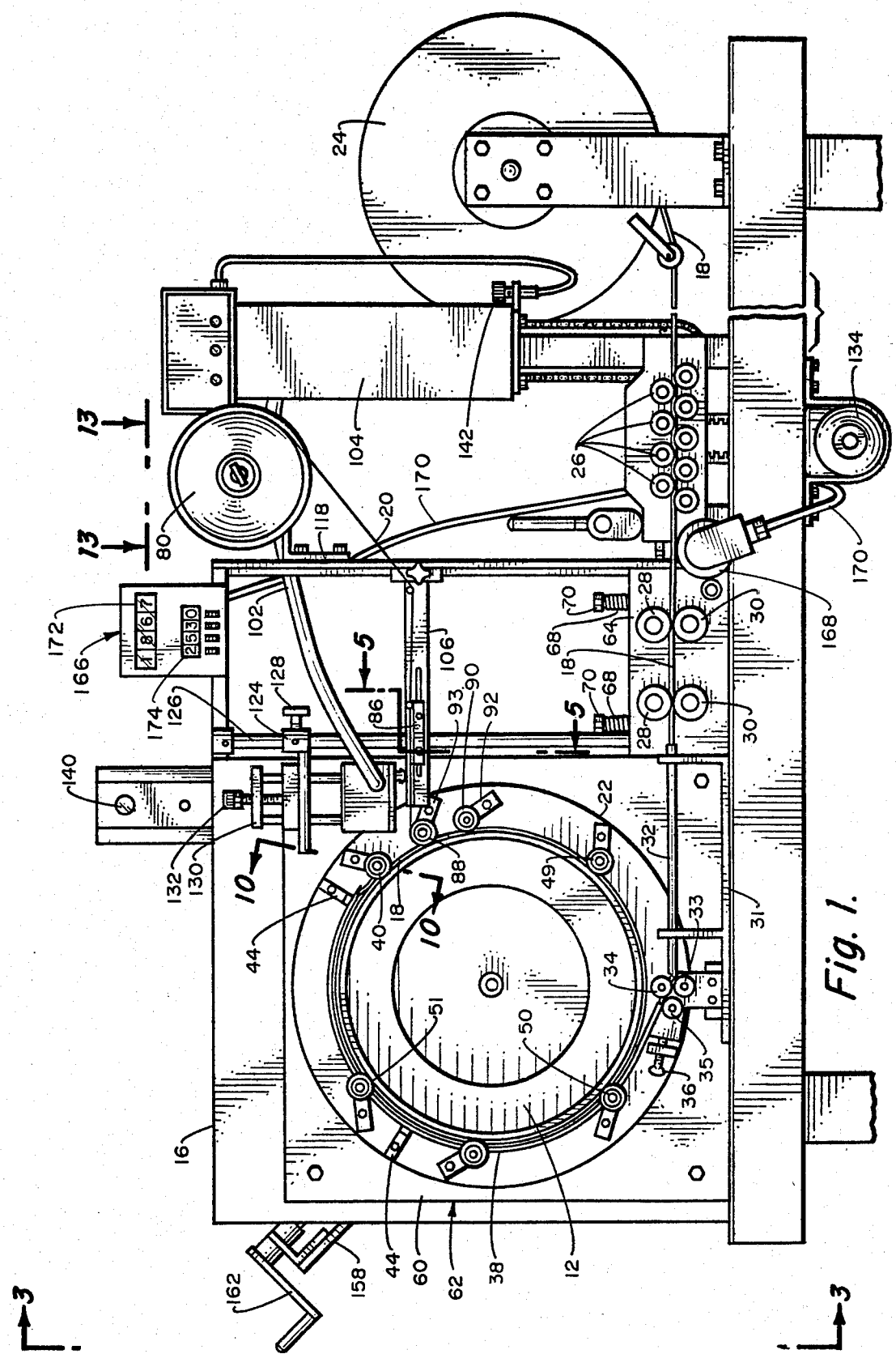
FIG. 1 is a front elevational view of the flexible duct forming apparatus of the present invention.
Figure 3:
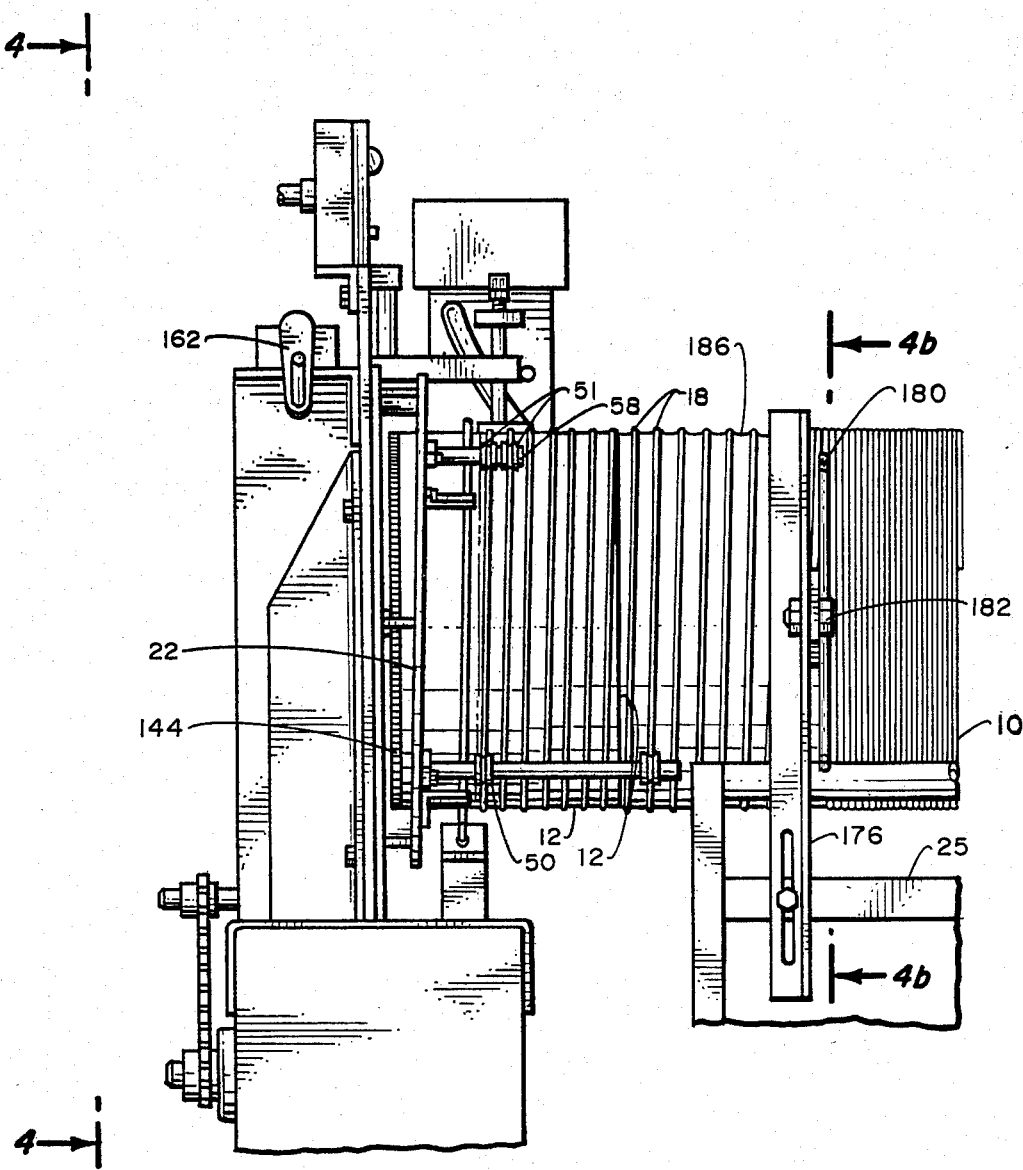
FIG. 3 is a side view in partial section of the flexible duct forming apparatus taken at 3—3 of FIG. 1.
Figure 5:
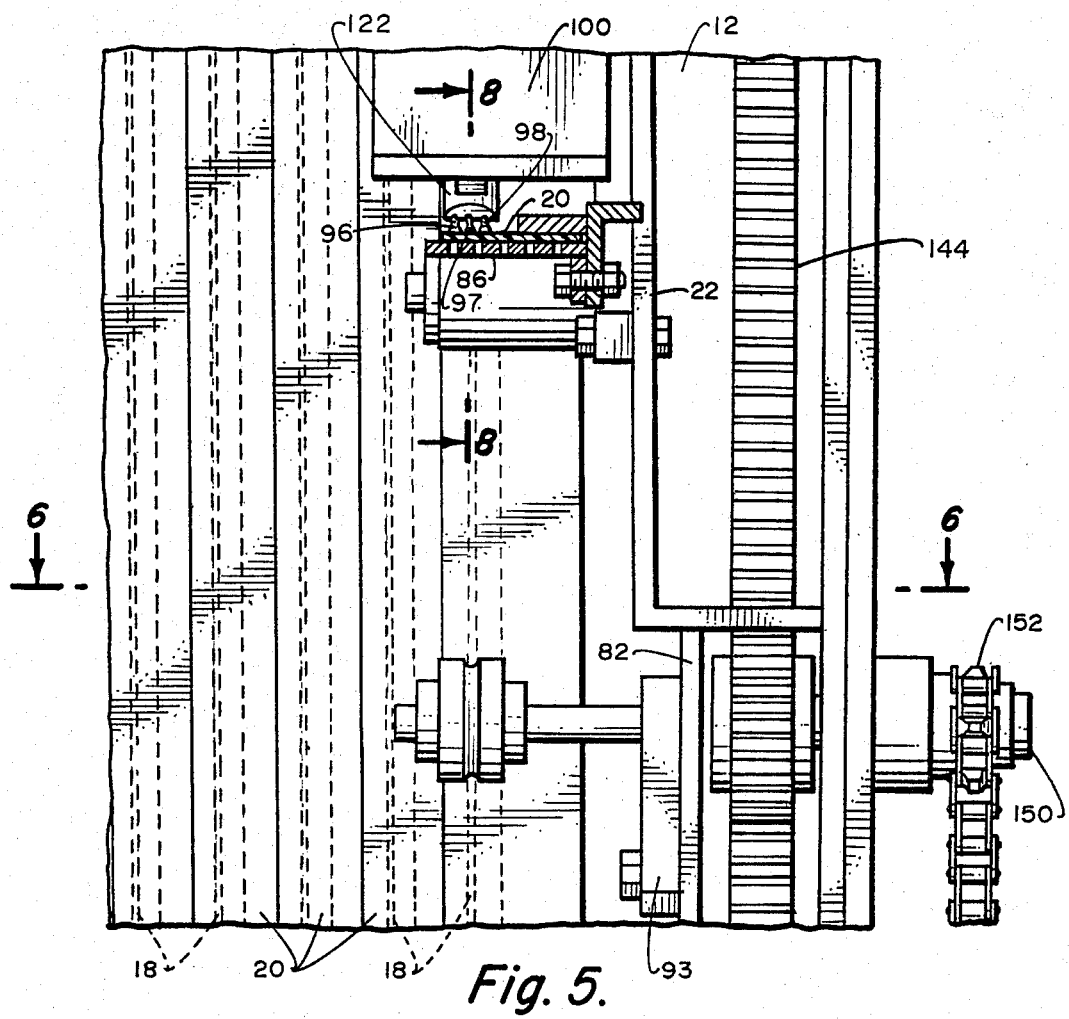
FIG. 5 is a partial sectional view illustrating the wrapping of the flexible strip material on the mandrel taken at 5—5 of FIG. 1.
Figure 6:
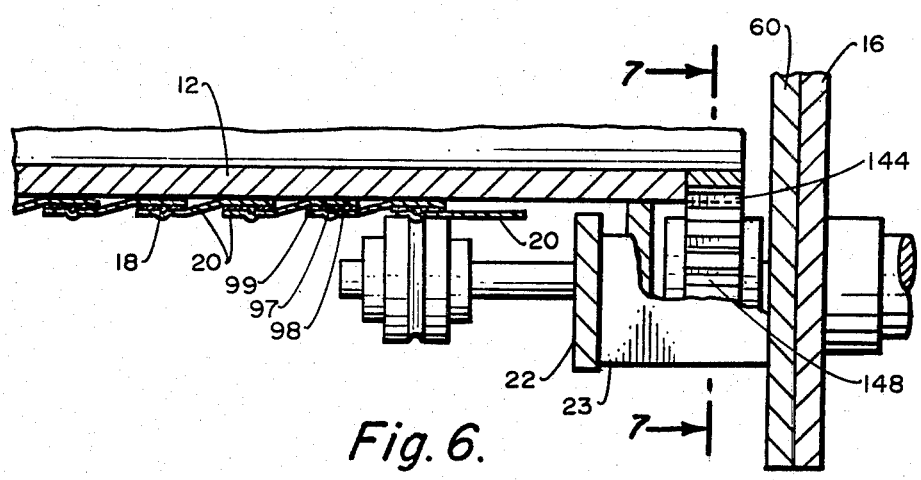
FIG. 6 is a partial sectional view taken at 6—6 of FIG. 5.

Referring now to FIGS. 1 through 3 of the drawings, flexible duct 10 is continuously formed on mandrel 12 supported by adjustable bearing 14 mounted on base plate 16. As is known in the art, flexible duct is formed of a flexible material with a tubular shape being maintained by reinforcing wire covered by the flexible material In the flexible tubular duct of the present invention, reinforcing wire 18 is guided onto mandrel 12 in a helical path which is substantially constant in diameter and pitch. Flexible strip material 20 is wrapped around mandrel 12, also in substantially constant helical path with adjacent wraps of the flexible material overlapping as shown in FIGS. 5 and 6. Reinforcing wire 18 is guided between the overlapping wraps and encapsulated by sealing these ovelapping edges in any suitable manner, such as with an adhesive or by the application of heat. Flexible tubular duct will be continuously formed on the rotating mandrel as flexible strip material and reinforcing wire is supplied during operation. The flexible tubular duct is delivered to conveyor or run-off table 25 of FIG. 3 for cutting into conveniently selected lengths.

Reinforcing wire 18 is formed into a helix of substantially constant diameter and pitch by wire forming assembly 62. Wire 18 is fed from supply roll 24 through a series of straightening rollers 26, drive rollers 28 and 30, to guide tube 32. The wire 18 then passes through casting rollers 33, 34, and 35 which bend or deform wire 18 to produce a coil diameter conforming to the size of mandrel 12 being used to form tubular duct 10. Casting roller 35 is adjustable by thumb screw 36 to set the amount of deformation of the wire to fit the particular mandrel. Once set, little if any further adjustment need be made to the casting rollers because they will remain with fixed helical ring 22 of wire forming assembly 62 when removed from the machine, as will be described in greater detail hereinafter.

Deformed wire 18 is then guided onto mandrel 12 by passing through arcuate guide tube 38, under guide roller 40, having a circumferential groove 42 in registration with wire 18. Guide tube 38 and guide roller 40 are mounted on fixed helical ring 22 and thus provide a continuous helical pitch for reinforcing wire 18. Guide tube 38 is attached to helix ring 22 by means of brackets 44 which thus keeps the pitch constant. Guide roller 40 is mounted on shaft 58 attached to bracket 46 adjustably fastened to helical ring 22 by bolt 48. Thus, the position of guide roller 40 relative to mandrel 12 can be varied by loosening bolt 48 and rotating bracket 46.

As can be seen, additional guide rollers 49, 50 and 51 adjustably mounted on helical ring 22 are spaced around mandrel 12. Each of these guide rollers has a groove similar to groove 42 in roller 40 in registration with the reinforcing wire to guide completed flexible tubular duct off mandrel 12 onto the conveyor or run-off table 25 (FIG. 3).

Figure 10:
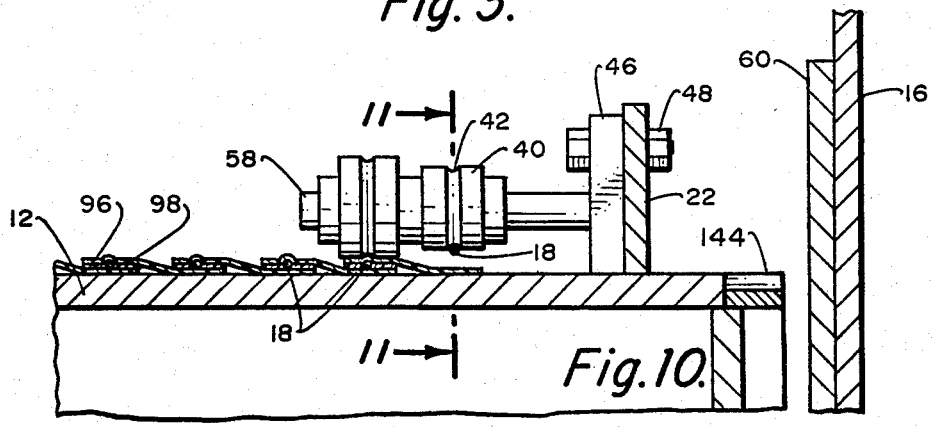
FIG. 10 is a partial sectional view taken at 10—10 of FIG. 1.

As can be seen in FIG. 10, the guide rollers are mounted on shafts 58 attached to the respective bracket for adjusting the position of the roller relative to mandrel 12. Each shaft may have two or more rollers having their groove in registration with the reinforcing wire of the tubular duct and it is preferred that there be sufficient rollers to continue to guide the duct for at least one complete revolution after sealing.

The preselected lengths of duct being formed by the machine are determined by a digital counter which counts the quantity of wire necessary to make the length required. Counter 166 receives an input from rotary wheel 168 through cable 170. The counter 166 has two displays 172 and 174. Upper display 172 shows the count received from rotary wheel while lower display 174 has the number of counts representing the preset length.

When upper display 172 reaches the preset count on lower display 174 it is automatically reset to zero. At this preset count the amount of completed duct exiting from the machine onto run-off table 25 will be the length desired. The operator can then cut the duct at this length or mark it for cutting later. If desired, the reset signal in counter 166 could be used to stop the machine automatically so that the duct could easily be cut at the selected length. This, however, would reduce production time.

Counter 166 is preferably an electronic rotary digital counter such as those manufactured by Red Lion Controls. A model CA400DU counter allows the counter to be dialed into the lower display. At the dialed-in-count the upper display resets to zero indicating the selected length of completed duct has exited to run-off table 25. Other types of counters would also be suitable if they give some indication when a preselected length has been reached.

Wire forming assembly 62 having helical ring 22 is shown more clearly in FIG. 2 with the guide rollers and casting rollers removed for clarity. Helical ring 22 is supported on plate 60 by varying height stand-offs 23 thus providing a complete reinforcing wire assembly; that is, fixed helical ring 22 with arcuate guide tube 38 and guide rollers adjustably attached. Also attached to plate 60 is a bracket 31 supporting tubular guide 32 and casting rollers 33, 34 and 35 as well as thumb screw 40 adjustment 36. Thus, to change the duct forming apparatus to produce different diameter duct, the entire wire forming assembly 62 may be removed from base 16 intact. If the particular wire forming assembly 62 is later replaced on the flexible duct forming apparatus, little, if any, adjustment will need to be made to begin a production run of that diameter flexible tubing. Wire forming assembly 62, by virtue of fixed helical ring 22, will thus maintain a substantially constant diameter and pitch for the reinforcing wire even when the apparatus is changed from one diameter duct to another. This particular feature is not only advantageous because it allows the duct forming apparatus to be easily changed from one diameter duct to another, but also because the constant diameter and pitch of the reinforcing wire allows a higher rate of production. This is because the rate of production can be increased without substantially affecting the fixed diameter and pitch set by wire forming assembly 62.

As can be seen in the side view of FIG. 3, each guide roller shaft 58 has at least two rollers. The particular length of each shaft 58 determines the position of the roller with respect to the mandrel and reinforcing wire 18, and helical ring 22 supporting the rollers automatically sets the proper angle of contact.

The amount of deformation imposed on reinforcing wire 18 is determined by casting or deforming rollers 33 through 35. Casting roller 35 is adjustable through thumb screw 36 toward or away from idler rollers 33 and 34, changing the amount of deformation of reinforcing wire 18. Once, however, the particular amount of deformation is determined for a particular wire-forming assembly, little, if any, further adjustment will be needed to be made when changing from one diameter duct to another; that is, changing from one wire-forming assembly to another.

Drive rollers 28 and 30 of the reinforcing wire feed system are spring-loaded to accommodate different size wire and also vary the amount of frictional force applied by the drive rollers to the wire. The drive rollers are mounted on upper and lower frames 64 and 66, respectively, and spring-loaded by means of springs 68. Spring 68 encircles threaded shafts attached to lower frame 66, which slides through holes (not shown) in upper frame 64. Adjustment of nuts 70 on top of the threaded shaft varies the amount of spring force applied by spring 68 on upper frame 64, thus varying the bite between drive rollers 28 and 30.

As was stated previously, a unique feature of the invention is the interchangeability of wire-forming assembly 62 with an appropriate diameter mandrel 12. For each diameter flexible duct, a different diameter mandrel 12 will be provided. Mandrel 12 is comprised of a drum having a centrally located mounting shaft 72 for insertion in adjustable bearing 14. The appropriate wire-forming assembly is then attached to the base plate encircling mandrel 12. Base 16 will have an appropriate hole pattern (not shown) for mounting different size wire forming assembly mounting plates 60. To simplify changing from one wire-forming assembly to another, lower corner 74 of wire-forming assembly plate 60 will be matched with lower corner 76 of base 16. Thus, adjustable bearing 14 is mounted on base 16 behind diagonal slot 78 for adjustment toward corner 76 for smaller size mandrels. The larger the mandrel, the more adjustment of bearing 14 toward the center of base 16.

The feed system for flexible strip material 20 is comprised of a free-wheeling roll of material 80 mounted on shaft 82 supported by bearing 84. The flexible strip material is passed over guide plate 86, roller 88, between a nip formed between rollers 88 and mandrel 12. The flexible strip is continuously wrapped in a helical path controlled by rollers 88 and 90. The proper helical path is determined by the fact that the supports for rollers 88 and 90 are also mounted on fixed helical ring 22. Roller 90 is mounted on a shaft attached to bracket 92 for adjusting the amount of force between roller 90 and mandrel 12. Rollers 88 and 90 also are provided with grooves for registration with reinforcing wire 18. As can be seen in FIG. 5, rollers 88 and 90 wrap flexible strip material 20 around the mandrel in the proper helical path determined by helical plate 22 supporting rollers 88 and 90 on brackets 92 and 93.

No separate drive system is needed for the flexible strip material as the frictional force between the nip formed by rollers 88 and 90 and mandrel 12 is sufficient to pull the flexible strip material from roll 80 over guide plate 86, guide roller 88, onto the mandrel to be wrapped continuously with overlapping edges, as can be seen in FIGS. 5 and 6.

Rollers 88 and 90 also serve a dual purpose in that they seal flexible strip material 20 around reinforcing wire 18 encapsulating the wire to continuously form the flexible tubular duct. Thus, rollers 88 and 90 serve as means for pressing the overlapping edges of flexible strip material 20 together to seal the material in addition to providing the frictional force necessary to wrap the material onto mandrel 12.

Figure 9:
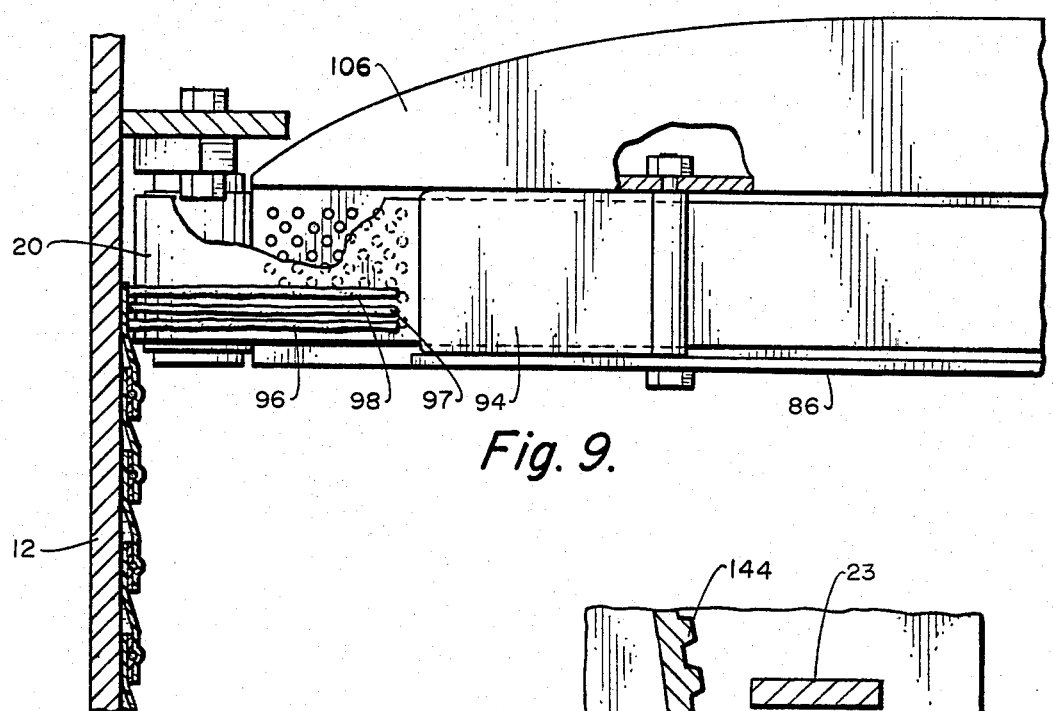
FIG. 9 is a partial sectional view taken at 9—9 of FIG. 8.
Figure 7:
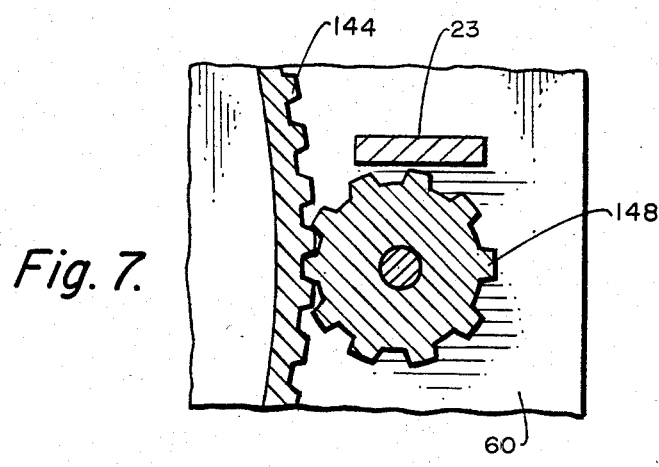
FIG. 7 is a partial section illustrating the drive system for the mandrel taken at 7—7 of FIG. 6.
Figure 11:
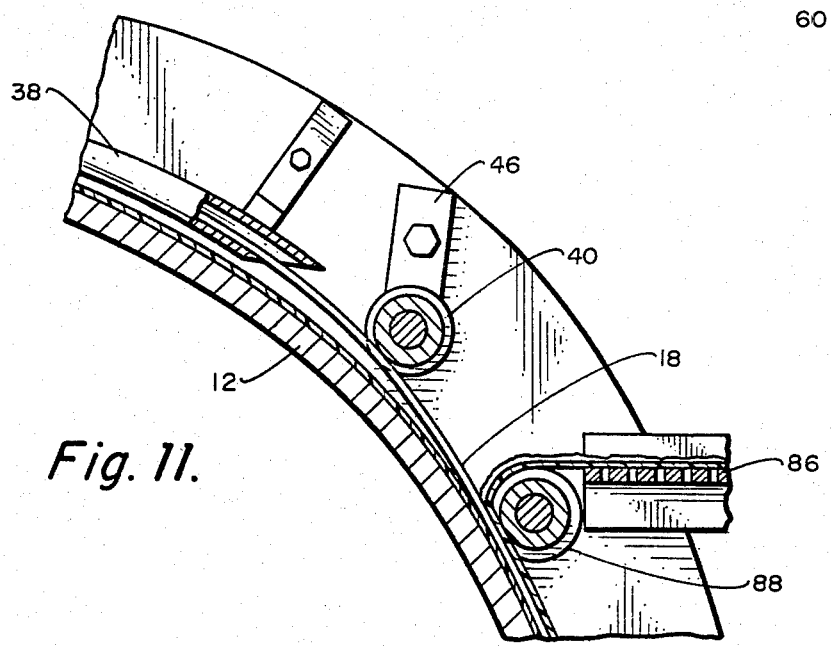
FIG. 11 is a partial sectional view illustrating the reinforcing wire guide system taken at 11—11 of FIG. 10.

In the preferred embodiment, flexible strip material 20 is sealed around reinforcing wire 18 by means of an adhesive applied to the strip material just prior to it entering the nip between rollers 88 and 90 and mandrel 12. As the flexible strip material passes over guide 86, beneath weighted smoothing plate 94, adhesive is applied in three continuous streams 96, 97 and 98 (FIG. 9) from adhesive-dispensing head 100. Two streams of adhesive 96 and 98 seal the flexible strip material to encapsulate the reinforcing wire. The third stream is provided to bond the flexible material to the reinforcing wire to help prevent movement after encapsulation. The adhesive is supplied to dispensing head 100 through tube 102 connected to hopper 104 which produces a hot melt glue. Although in the preferred embodiment, hot melt glue is shown and described, other methods of sealing the flexible strip may be used if desired, such as solvent or by application of heat.

Figure 8:
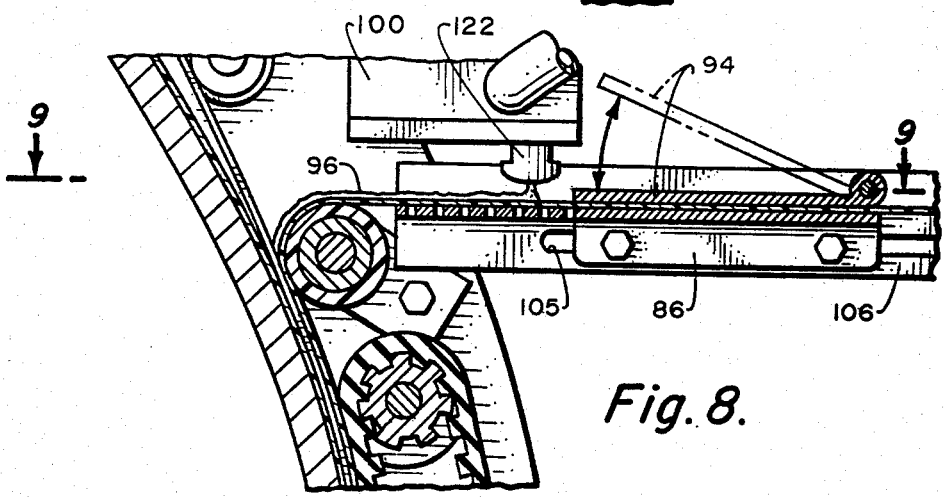
FIG. 8 is a partial sectional view taken at 8—8 of FIG. 5.

Of course, the flexible strip supply system is adjustable to accommodate different diameter mandrels and thus produce different diameter ducts. For example, guide plate 86 is mounted on vertically adjusted guide arm 106, attached to frame 120 for raising or lowering the guide plate according to the diameter of the duct being produced. Additionally, guide plate 86 is horizontally adjustable in slot 105 on guide arm 106 as shown in FIG. 8. Holes are provided in the end of guide plate 86 beneath the area where the continuous streams of adhesive 96, 97 and 98 are applied for cooling purposes.

The flexible strip feed system also permits producing flexible duct of a variety of flexible strip materials, aluminum, scrim, and various flexible plastics. Since all of these materials vary in flexibility, some control must be provided over free-wheeling roll 80. This control is illustrated in FIGS. 13 and 14. To control the tension on flexible strip material 20, supplied from free-wheeling roll 80, a drum 108 is provided on the end of shaft 82. A brake is provided in the form of flexible band 110, secured at one end, passing over drum 108. The opposite end 114 of band 110, is adjustable by means of micrometer adjustment device 116 to vary the force applied by flexible band 110 on drum 108. Thus, by rotating micrometer adjustment 116, friction can be applied to drum 108, increasing the tension on flexible strip material 20. The versatility of the flexible duct forming apparatus is thus considerably increased because a wide variety of flexible strip material can now be used to produce the flexible duct. Bearing 84 and brake means are mounted on bracket 118 attached to frame 120 supporting vertically adjustable guide arm 106.

Since guide plate 86 must be adjustable to accommodate different size flexible ducts, so too adhesive dispensing head 100 must be adjustable. That is, adhesive dispensing head 100 is provided with nozzle 122 having three jets for laying down three continuous streams 96, 97 and 98 on flexible strip material 20 passing over guide plate 86. Thus, adhesive dispensing head 100 must raise or lower in conjunction with guide plate 86. To accomplish this, the adhesive dispensing head is mounted on collar 124, slideably supported on vertical shaft 126 for adjustment. As shaft 126 is cylindrical, adhesive dispensing head 100 may slide or rotate on the shaft to provide for vertical and horizontal adjustment. Adhesive dispensing head 100 is clamped on shaft 126 by means of screw 128. Fine adjustment of the glue dispensing head is provided through yoke 130 having a fine adjustment through screw 132.

The drive system for rotating mandrel 12, reinforcing wire feed system, flexible strip material feed system, and adhesive dispensing system, are all provided by a single source eliminating the necessity of synchronizing the operation of these various components. Variable speed motor 134 is connected through gears on intermediate shaft 136 to gears on intermediate shaft 138 in engagement with gears mounted on wire feed rollers 28 and 30. Intermediate shaft 138 is also geared to drive means for rotating the mandrel which will be described in greater detail hereinafter. Intermediate shaft 130 is also connected through gears to a pump (not shown) for pumping adhesive from hopper 104. The speed of motor 134 is controlled by variable rheostat 140 (FIG. 1.) This permits low running speeds at start-up and allows for high production speeds after a few feet of completed duct have been successfully produced. Thus, variable speed motor 134 controls the rate of delivery of reinforcing wire 18, flexible strip material 20, and adhesive from adhesive-dispensing head 100, while simultaneously controlling the rotational speed of mandrel 12. In addition, the glue delivery system includes a fine adjustment 142 to effectively control the flow of adhesive from nozzle 122 on the glue dispensing head.

The drive system for mandrel 12 is unique in that the mandrel is moved to engage the drive system rather than vice versa. As can be seen in FIGS. 2 through 7, and 12, gear 144 is mounted on the inner end of the drum portion of mandrel 12 and secured by bolts (not shown). Rotation of mandrel 12 is accomplished by bringing gear 144 into engagement with pinion gear 148 mounted on shaft 150. Shaft 150 is driven by means of sprocket 152 linked through intermediate shaft 138 to motor 134. Thus, motor 134 drives chain 154 passing over idler gear 156 to rotate sprocket 152 and shaft 150, thus driving the mandrel through engagement of gear 144 and pinion gear 148.

Gears 144 and 148 are selected to have a particular pitch and number of teeth which permit different diameter gears on different size mandrels to engage pinion gear easily and comfortably without binding. Gears having a ten diametrical pitch (10DP) were found to be most suitable. Thus, with a twenty tooth 10DP pinion gear the gear for each mandrel is approximately the same diameter as the mandrel and conveniently comes out to be an even multiple of the mandrel diameter. That is, a six (6") inch diameter mandrel will have a sixty tooth gear, an eight (8") inch mandrel will have eighty tooth gear and so on up to a twenty (20") inch mandrel which will have a two hundred tooth gear. The number of teeth on each mandrel gear will thus be a multiple of ten times the number indicating the diameter.

Figure 4:
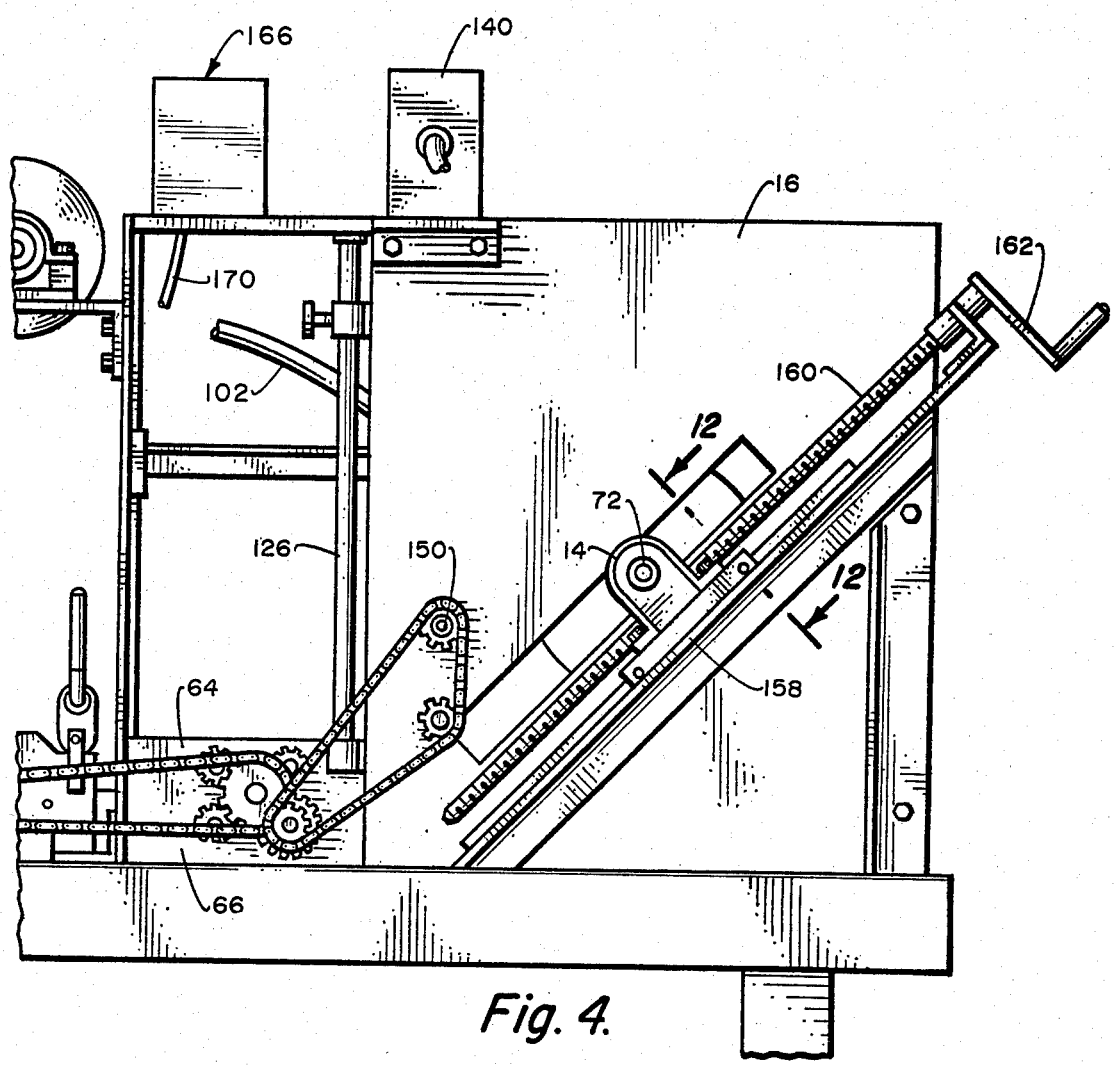
FIG. 4 is a rear view in partial section of the flexible duct forming apparatus taken at 4—4 of FIG. 3.

The adjustable mounting for mandrel 12 can be seen more clearly in FIG. 4. Adjustable bearing 14 is slideably supported on track 158. Shaft 72 of mandrel 12 engages bearing 14 as can be seen in FIG. 12. The position of mandrel 12 can now be adjusted by rotation of worm screw 160 through crank 162. Worm screw 160 engages bearing 14 as shown in FIG. 12 moving it along track 158. Screw 164 is provided for locking the position of the bearing on the track once the mandrel has been adjusted such that gear 144 is in engagement with pinion gear 148.

Thus, to change the flexible duct forming apparatus from production of one diameter duct to another, flexible strip material 20 and reinforcing wire 18 are withdrawn and wire-forming assembly 62 unbolted and lifted off base 16. Crank 162 may now be operated to move the mandrel and thus gear 144 away from pinion gear 148. Mandrel shaft 72 may now be withdrawn from adjustable bearing 14. A new mandrel is then inserted in the bearing and crank 162 again operated until gear 144 on the replaced mandrel again engages pinion 148. The associated wire-forming assembly 62 is then slipped over the mandrel and wire-forming assembly base plate 60 bolted to base 16. The flexible duct forming apparatus is then turned on and flexible strip material 20 fed into the nip between rollers 88 and 90 and mandrel 12. If necessary, the bite may be adjusted according to the type of flexible strip material used. Reinforcing wire 18 is then fed into guide tube 32 through casting rollers 33 through 35, and into arcuate guide tube 38. During this operation, the machine is run at a very slow speed controlled by rheostat 140. A few feet of flexible duct material may then be produced to determine if any minor adjustments in the application of adhesive, flexible strip feed system, or reinforcing wire feed system need to be made. If wire-forming assembly 62 has been previously used, little or no adjustment will need to be made. After it has been determined that a few feet of flexible duct have been successfully produced, the machine may be increased in speed to provide high speed production run.

A structure for guiding completed duct off mandrel 12 onto run-off table 25 is shown in FIGS. 3 and 4b. The structure includes a pair of stanchions 176 securely attached to the sides of run-off table 25 a short distance from the end of mandrel 12. The stanchions may be welded to run-off table 25 or adjustably bolted as shown in FIG. 3. Stanchions 176 have slots 178 for supporting arcuate guides or fingers 180 by means of bolts 182 through slotted arms 184. This arrangement permits a wide range of vertical and horizontal adjustments or complete removal and replacement with different size guides 180 for different diameter ducts.

The guides 180 ride in the depression 186 between adjacent revolutions of reinforcing wire 18. Thus, as the revolving duct passes between the guides 180 it is slightly stretched and pulled off the mandrel onto the run-off table. This not only assists in a smooth transition from the mandrel to the run-off table, but also serves as a test for the bond. With the completed duct stretched out between guides 180 and the end of mandrel 12, the operator will be able to view any separations where there may be a defective bond.

Thus, there has been described a flexible duct forming machine or apparatus and method in which the machine can be quickly and easily changed from the production of one diameter duct to the production of another. This is accomplished by using a reinforcing wire-forming assembly which can be removed and replaced without the necessity of adjusting any of the diameter and pitch forming guides which are mounted on a fixed helical ring, eliminating any change in the diameter or pitch when changing from one diameter duct to another. The wrapping of flexible strip material on the rotating mandrel to produce the flexible duct is also controlled by the same wire-forming assembly and includes brake adjustment means for accommodating a number of types of flexible material such as plastic, aluminum foil, or fiberglassed reinforced foil called "scrim." The apparatus or machine described herein can continuously produce an improved flexible tubular duct in a variety of sizes of various materials in a relatively high-speed operation.

Obviously, many modifications and variations of the present invention are possible in light of the above teachings. It is therefore to be understood that the full scope of the invention is not limited to the details disclosed herein, but only by the claims, and may be practiced otherwise than as specifically described.

What is claimed is:

1. A flexible duct forming apparatus comprising:
    a base;
    a mandrel;
    support means on said base for rotatably supporting said mandrel;
    drive means for rotatably driving said mandrel; said drive means comprising;
        a pinion gear mounted on said base,
        a gear mounted on the rear of said mandrel;
        motor means for driving said pinion gear;
    said mandrel support means adapted to move said mandrel to bring said mandrel gear in engagement with said pinion gear;
    flexible strip material feed means for feeding flexible strip material to said mandrel;
    wrapping means for wrapping said flexible strip onto said mandrel in a helical path with adjacent wraps having overlapping edges;
    wire feed means comprising;
        wire deforming means for deforming said wire to produce a predetermined coil diameter,
        wire guide means forming a substantially fixed helical path of constant pitch and diameter for guiding and holding said wire on said substantially fixed helical path from said wire deforming means to between the overlapping edges of said flexible strip material,
    sealing means for sealing the overlapping edge of said flexible strip material to encapsulate said wire whereby flexible wire reinforced duct is continuously formed on said mandrel;
    arcuate guide means for guiding completed duct off said mandrel;
    said guide means constructed and arranged to ride in the depression between adjacent revolutions of the reinforcing wire to stretch completed duct as it is comes off the mandrel thereby testing the bond at the overlapping edges of said flexible material.

2. The apparatus according to claim 1 in which said gears are 10DP gears.

3. The apparatus according to claim 2 in which said mandrel gear is approximately the same diameter as the mandrel.

4. The apparatus according to claim 2 in which the diameter of said mandrel gear is selected to provide a gear having a number of teeth which is an even multiple of the mandrel diameter.

5. The apparatus according to claim 1 in which said moving means comprises:
    a bearing adjustably mounted on said base for supporting said mandrel.

6. The apparatus according to claim 5 in which said adjustably mounted bearing includes:
    a track mounted on said base;
    said bearing being mounted on said track for traverse movement;
    a worm screw passing through said bearing;
    crank means attached to said worm screw whereby the position of said bearing on said track may be adjusted by turning said crank.

7. The apparatus according to claim 6 in which said mandrel includes:

a centrally located shaft;

said shaft adapted to engage said bearing to provide a cantilevered support for said bearing.

8. The apparatus according to claim 7 in which said wire feed means includes:

a plurality of wire feed rollers;

drive means for driving said wire feed rollers.

9. The apparatus according to claim 8 in which said wire feed roller drive means includes:

gear means attached to said wire feed rollers;

connecting means connecting said gear means to the motor for driving said pulley wheel means whereby the wire feed rollers and pulley wheel means are simultaneously and synchronously driven.

10. The apparatus according to claim 9 in which said wire feed rollers have opposing rollers forming at least one bite through which said wire will pass; spring loading means for spring loading the rollers forming said bite whereby variations in the wire are accommodated.

11. The apparatus according to claim 10 in which said spring loading means comprises;

a pair of rollers on a first frame means;

a pair of rollers on a second frame means in opposition to the pair of rollers on said first frame means;

said second frame means being movably secured by a plurality spring means whereby the bite formed by said pairs of rollers may vary according to the spring force; and spring force adjusting means for adjusting the force of each of said plurality of springs individually.

12. The apparatus according to claim 11 in which said spring force adjustment means comprises:

a pair of threaded rods attached to said first frame passing through and extending beyond said second frame;

a nut threaded on each of said rods; and a spring slideably encircling each rod compressed between said nut and said second frame whereby tightening of said nut compresses and increases the force applied by each of said springs individually.

13. The apparatus according to claim 12 in which said sealing means includes:

adhesive dispensing means for applying adhesive to the overlapping edge of said flexible strip means to seal said overlapping edges with said sealing means.

14. The apparatus according to claim 13 including:

an adhesive dispensing head;

said adhesive dispensing head adapted to apply at least two continuous streams of adhesive on the flexible strip overlapping edge before it passes between said sealing means.

15. The apparatus according to claim 14 in which:

said adhesive dispensing head is mounted for applying said streams of adhesive onto the flexible strip while it is on said guide plate.

16. The apparatus according to claim 15 in which:

said adhesive dispensing head and smoothing plate are adjustably mounted to be adjusted to accommodate larger diameter mandrels.

17. The apparatus according to claim 16 in which said adhesive is a hot melt adhesive.

18. The apparatus according to claim 17 in which said adhesive dispensing means includes:

a hot melt adhesive hopper;

a pump for supply of hot melt glue to said adhesive dispensing head;

adhesive pump drive means for driving said pump.

19. The apparatus according to claim 18 in which said adhesive pump drive means comprises:

pump gear means;

linking means linking said pump gear means to said motor for driving said mandrel pulley wheel means whereby said pulley wheel means, said wire feed rollers and said adhesive pump means are driven simultaneously and synchronously.

20. The apparatus according to claim 19 including:

flow adjusting means for adjusting the flow of adhesive from said hopper to said adhesive dispensing head.

21. The apparatus according to claim 20 including:

variable speed means for varying the speed of said motor for accommodating the feed rate of wire, flexible material and adhesive for different diameter mandrels to produce different diameter duct.

22. The apparatus according to claim 14 in which there are three continuous streams of adhesive; one of said streams being placed to securely bond said reinforcing wire to said flexible strip material to prevent movement.

23. The apparatus according to claim 22 in which said three adhesive streams are supplied by a three jet nozzle attached to said adhesive dispensing head.

24. The apparatus according to claim 1 including means for indicating the completion of preselected lengths of duct.

25. The apparatus according to claim 27 in which said indicating means comprises means for indicating the quantity of reinforcing wire used for said preselected length of duct.

26. The apparatus according to claim 25 in which said indicating means includes digital counting means; said counting means adapted to automatically reset to zero when the preselected length of duct is completed.

27. The apparatus according to claim 26 in which said digital counting means comprises an electronic digital counter having a variable display and a preset display; said counter automatically resetting said variable display to zero when its count equals the count on the preset display.

* * * * *